United States Patent
Crowe et al.

(10) Patent No.: US 9,940,156 B2
(45) Date of Patent: Apr. 10, 2018

(54) DECREASING HARDWARE RESOURCE AMOUNT ASSIGNED TO VIRTUAL MACHINE AS UTILIZATION OF HARDWARE RESOURCE DECREASES BELOW A THRESHOLD

(71) Applicant: Lenovo Enterprise Solutions (Singapore) PTE. LTD., New Tech Park (SG)

(72) Inventors: John Scott Crowe, Durham, NC (US); Gary David Cudak, Wake Forest, NC (US); Jennifer J. Lee-Baron, Morrisville, NC (US); Nathan Peterson, Oxford, NC (US); Amy Leigh Rose, Chapel Hill, NC (US); Bryan L. Young, Tualatin, OR (US)

(73) Assignee: Lenovo Enterprise Solutions (Singapore) PTE. LTD., New Tech Park (SG)

( * ) Notice: Subject to any disclaimer, the term of this patent is extended or adjusted under 35 U.S.C. 154(b) by 95 days.

(21) Appl. No.: 15/011,261

(22) Filed: Jan. 29, 2016

(65) Prior Publication Data

US 2017/0220366 A1 Aug. 3, 2017

(51) Int. Cl.
*G06F 9/455* (2018.01)
*G06F 9/50* (2006.01)

(52) U.S. Cl.
CPC ........ *G06F 9/45558* (2013.01); *G06F 9/5022* (2013.01); *G06F 9/5077* (2013.01); *G06F 9/45533* (2013.01); *G06F 9/5016* (2013.01); *G06F 2009/45583* (2013.01); *G06F 2009/45591* (2013.01)

(58) Field of Classification Search
None
See application file for complete search history.

(56) References Cited

U.S. PATENT DOCUMENTS

| | | | | |
|---|---|---|---|---|
| 9,722,945 | B2* | 8/2017 | Siciliano | H04L 47/70 |
| 2006/0005198 | A1* | 1/2006 | Uchishiba | G06F 9/5077 718/104 |
| 2008/0183865 | A1* | 7/2008 | Appleby | H04L 67/1008 709/224 |
| 2009/0158275 | A1* | 6/2009 | Wang | G06F 9/5077 718/1 |
| 2012/0023501 | A1* | 1/2012 | Chi | G06Q 30/0283 718/103 |

(Continued)

OTHER PUBLICATIONS

Das, K., "Dynamic scaling of CPU and RAM", Apache Cloudstack, online cwiki.apache.org/confluence/display/CLOUDSTACK/Dynamic+scaling+of+CPU+and+RAM>, May 21, 2014, 5 pp.

(Continued)

*Primary Examiner* — Abu Zar Ghaffari
(74) *Attorney, Agent, or Firm* — Jason Friday

(57) ABSTRACT

An amount of a hardware resource is assigned to a virtual machine (VM) to be run on a computing device including the hardware resource. The VM is caused to run on the computing device, and usage of the hardware resource by the VM is monitor. In response to determining that the usage of the hardware resource by the VM is less than a threshold, the amount of the hardware resource assigned to the VM is decreased.

15 Claims, 5 Drawing Sheets

(56) References Cited

U.S. PATENT DOCUMENTS

| | | | | |
|---|---|---|---|---|
| 2014/0058871 A1* | 2/2014 | Marr | ................... | G06F 9/45533 |
| | | | | 705/26.1 |
| 2014/0137110 A1* | 5/2014 | Engle | ................... | G06F 9/5022 |
| | | | | 718/1 |
| 2014/0344810 A1* | 11/2014 | Wang | ..................... | G06F 9/455 |
| | | | | 718/1 |
| 2014/0359356 A1* | 12/2014 | Aoki | ................... | G06F 11/1441 |
| | | | | 714/24 |
| 2015/0309828 A1* | 10/2015 | Shaik | ................... | G06F 9/5027 |
| | | | | 718/1 |
| 2016/0103717 A1* | 4/2016 | Dettori | ................... | G06F 9/542 |
| | | | | 719/318 |
| 2017/0199770 A1* | 7/2017 | Peteva | ................. | G06F 9/5088 |

OTHER PUBLICATIONS

Marco, "VCAP5-DCA Objective 3.2—Optimize Virtual Machine Resources", blog—The Virtual World of Marc O Polo, online blog.mrpol.nl/2012/12/07/vcap5-dca-objective-3-2-optimize-virtual-machine-resources/>, Dec. 7, 2012, 80 pp.

* cited by examiner

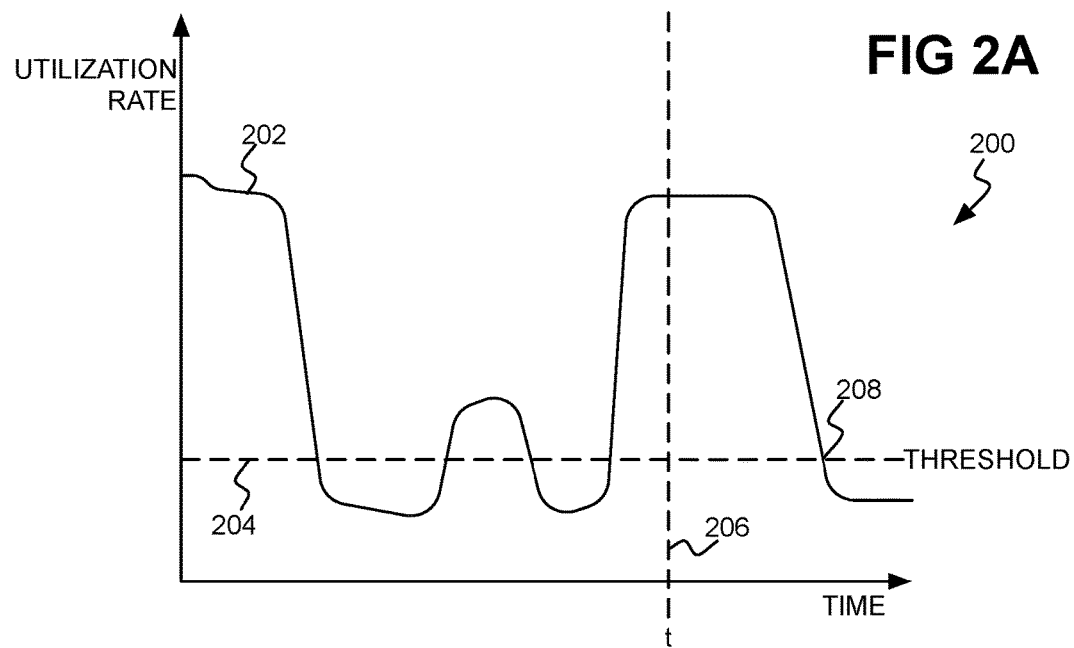
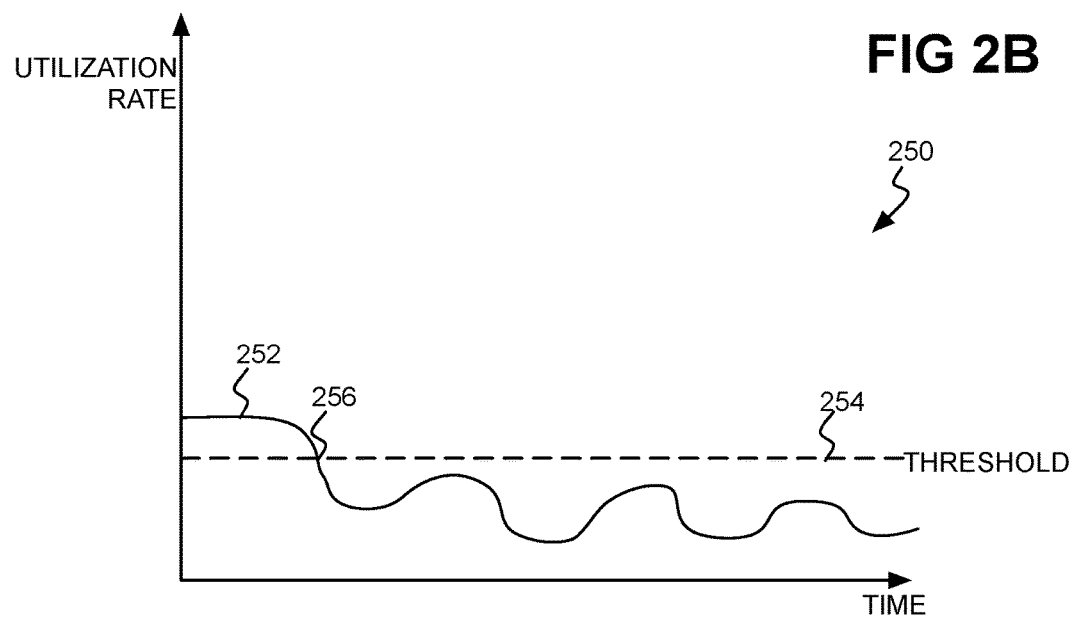

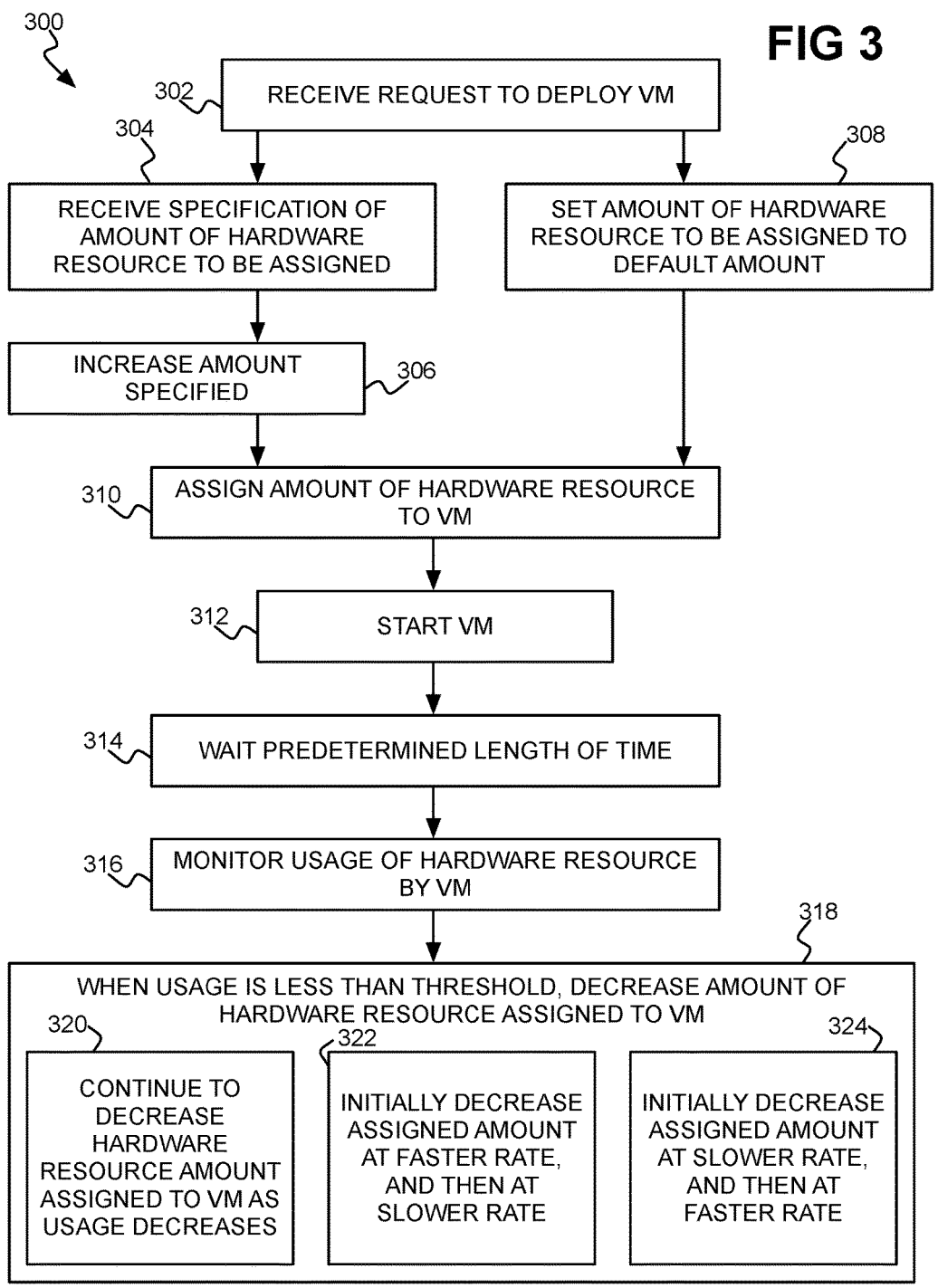

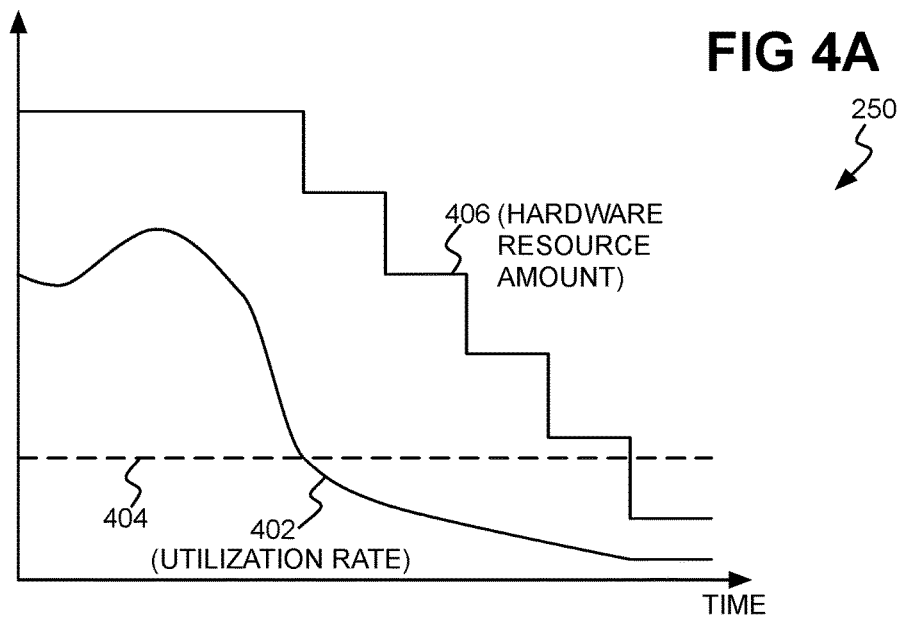
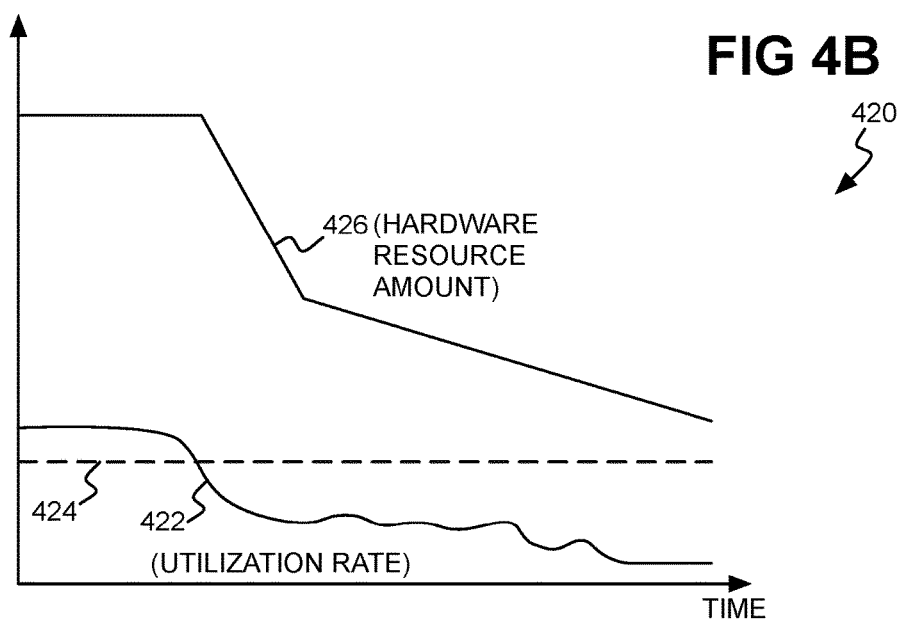

DECREASING HARDWARE RESOURCE AMOUNT ASSIGNED TO VIRTUAL MACHINE AS UTILIZATION OF HARDWARE RESOURCE DECREASES BELOW A THRESHOLD

BACKGROUND

A computing device typically runs one instance of an operating system that has access to the hardware resources of the computing device. However, a technique known as virtualization permits a computing device to run a number of instances of operating systems. In virtualization, the computing device instantiates a number of such virtual machines (VMs), and each VM runs its own instance of an operating system.

SUMMARY

An example method includes assigning, by a processor, an amount of a hardware resource to a virtual machine (VM) to be run on a computing device including the hardware resource. The method includes causing, by the processor, the VM to run on the computing device. The method includes monitoring, by the processor, usage of the hardware resource by the VM. The method includes, in response to determining that the usage of the hardware resource by the VM is less than a threshold, decreasing, by the processor, the amount of the hardware resource assigned to the VM.

An example system includes a computing device having a hardware resource, and a hypervisor to deploy a virtual machine VM on the computing device and to assign an amount of the hardware resource to the VM. The hypervisor is to monitor usage of the hardware resource by the VM when the VM is running. In response to determining that the usage is less than a threshold, the hypervisor is to decrease the amount of the hardware resource assigned to the VM.

An example non-transitory computer-readable data storage medium stores computer-executable code that a hypervisor executes to perform a method. The method includes assigning an amount of a hardware resource to a VM to be run on a computing device including the hardware resource. The method includes starting the VM on the computing device, and monitoring usage of the hardware resource by the VM. The method includes, in response to determining that the usage of the hardware resource by the VM is less than a threshold, decreasing the amount of the hardware resource assigned to the VM.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

FIGS. 2A and 2B are diagrams of example graphs depicting different hardware resource utilization rates by a VM.

FIG. 3 is a flowchart of a method to decrease the amount of a hardware resource assigned to a VM as usage of the hardware resource decreases.

FIGS. 4A, 4B, and 4C are diagrams of example graphics depicting different strategies by which the amount of a hardware resource assigned to a VM can be decreased when the VM's usage of the hardware resource falls below a threshold.

DETAILED DESCRIPTION

Figure 1:
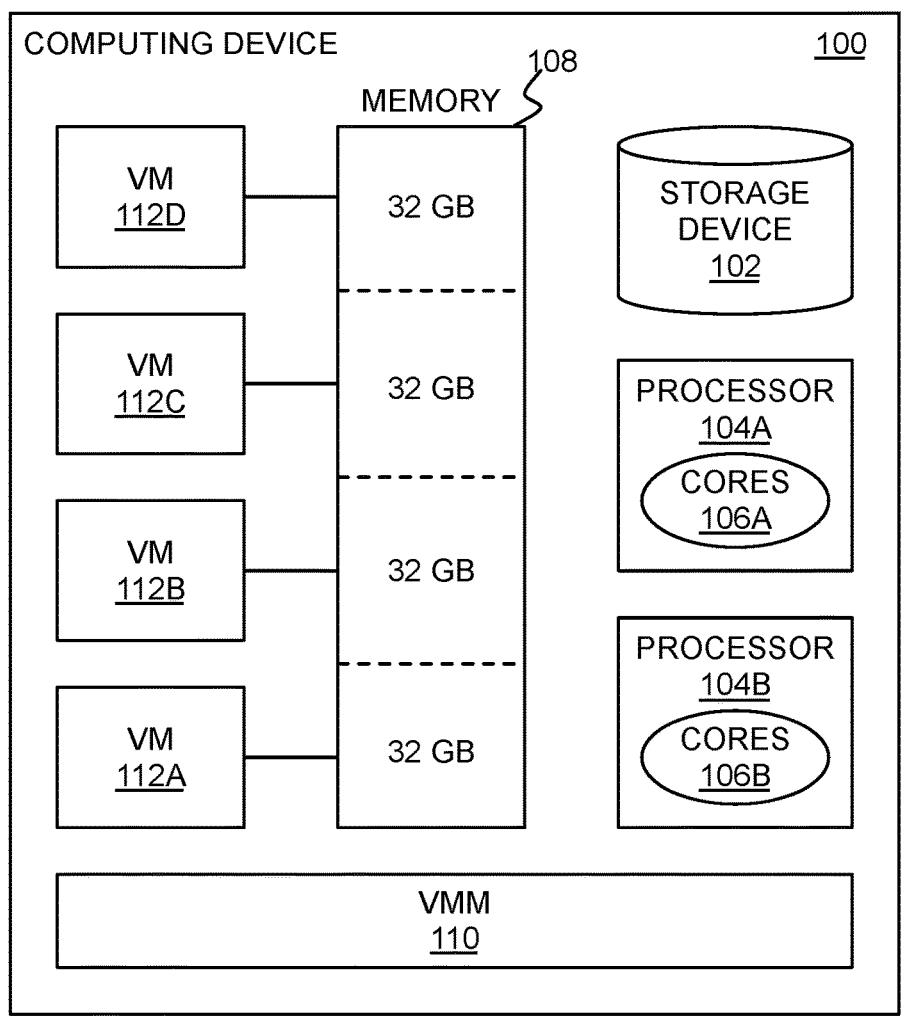
FIG. 1 is a diagram of an example computing device in which the amount of a hardware resource assigned to a virtual machine (VM) automatically decreases as utilization of the resource by the VM decreases.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the embodiment of the invention is defined only by the appended claims.

As noted in the background section, virtualization is a technique that permits a computing device to run more than one instance of an operating system on the same computing device as if there were multiple computing devices, which are referred to as virtual machines (VMs). The VMs typically share hardware resources, like memory, storage devices, and processors, of a given computing device. A VM manager (VMM), or hypervisor, manages the VMs.

A VM may be deployed to host a particular type of service used within an organization. However, as commonly occurs, the users of an organization mail be migrated to a different type of the same service. For example, the users may use a particular e-mail messaging platform, and then later be migrated to a different e-mail messaging platform. The original platform thus becomes a legacy platform, which may still be needed for occasional access to the data stored thereon, but which otherwise is not actively used.

Therefore, the VM running the legacy platform cannot be shutdown, but generally does not need the amount of hardware resources, such as memory, storage devices, and processors, that were originally assigned to the VM. Although administrators are encouraged to periodically audit VM loads, this is a manual and laborious process. Furthermore, more often than not, such auditing just results in VMs being migrated from one computing device to another device.

Additionally, when a VM is first deployed, the VM is typically generously assigned an amount of a hardware resource to ensure that the VM will not be starved for this resource and perform less than optimally, which is known as overcommitting of resources. Once the VM has been deployed, the actual utilization of the resource in question is rarely inspected to determine whether the VM has been assigned more of a hardware resource than it maximally needs. Indeed, the administrator deploying the VM may not have any idea as to how a VM is likely to be used, and thus may initially assign a large default amount of a hardware resource to the VM, but later be nervous to decrease that amount.

Disclosed herein are techniques that ameliorate these shortcomings. When a VM is to be run on a computing device including a hardware resource, the VM is assigned an amount of the hardware resource for its exclusive use. Once the VM is running, its usage of the hardware resource is monitored. If the VM's usage of the hardware resource is below a threshold, the amount of the resource assigned to the VM is automatically decreased.

Therefore, in the case when the service that a VM is running becomes a legacy service such that its utilization of a hardware resource declines, the amount of the resource assigned to the VM will be decreased. Similarly, in the case when a hardware resource is overcommitted to a VM, if the actual utilization of the resource by the VM suggests that such overcommittal is unnecessary, the amount of the resource assigned to the VM will be decreased. In both these cases, as well as in other cases, the net result is that more of the hardware resource in question is now available for assignment to other VMs. As such, utilization of hardware resources becomes more efficient.

FIG. 1 shows an example computing device 100. The computing device 100 includes hardware resources that are assignable to VMs. The hardware resources can include a storage device 102, such as a hard disk drive, an array thereof, and so on. The hardware resources can include one or more processors, such as processors 104A and 104B, collectively referred to as the processors 104, and which have processor cores 106A and 106B, respectively, which are collectively referred to as the processor cores 106. For example, there may be two, four, eight, or more processor cores 106A, and two, four, eight, or more processor cores 106B. The hardware resources further can include physical memory 108, such as volatile semiconductor dynamic random-access memory (DRAM). In the example of FIG. 1, there is 128 gigabytes (GB) of memory 108. The hardware resources can include other types of hardware resources as well, such as network adapters, graphical processing units (GPUs), and so on.

A VMM 110 runs on the computing device 100 in the example of FIG. 1, but in another implementation the VMM 110 runs on another computing device communicatively connected to the device 100. The VMM 110 is also referred to as a hypervisor. The VMM 110 is responsible for instantiating, or deploying, as well as managing and removing, VMs on the computing device 100. The VMM 110 is software that runs on underlying hardware. The hardware resources used by the VMM 110 are not depicted in FIG. 1; that is, the storage device 102, the processors 104, and the memory 108 are the hardware resources for VMs, and different hardware resources are for the VMM 110.

In the example of FIG. 1, four VMs 112A, 112B, 112C, and 112D, collectively referred to as the VMs 112, have been deployed on the computing device 100 via the VMM 110. Each VM 112 is exclusively assigned a portion of the storage space or capacity of the storage device 102. Each VM 112 may be exclusively assigned a number of cores 106 of one or both processors 104. For example, if each processor 104 includes eight processor cores 106, each VM 112 may be assigned four processor cores 106 of one of the processors 104. Each VM 112 is further exclusively assigned a portion of the physical memory 108. In the example of FIG. 1, each VM 112 is assigned 32 GB of the memory 108.

The techniques disclosed herein as to automatically decreasing the amount of a hardware resource assigned to a VM as utilization of the resource by the VM decreases are described in relation to FIG. 1 as to the memory 108. As an example, consider the VM 112A. Over time the utilization rate of the 32 GB of the memory 108 assigned to the VM 112A may decrease on average from 75% (i.e., 24 GB) to less than 25% (i.e., 8 GB). The threshold utilization rate may be 25%. Therefore, when the utilization rate of the memory 108 by the VM 112A drops below 25% for a sustained period of time, the VMM 110 may decrease the amount of memory 108 assigned to the VM 112A to 12 or 16 GB, or even to 8 GB. As an example, if the amount of memory 108 assigned 112A is decreased to 16 GB, this means that 16 GB of memory 108 is now available for assignment to one of the other VMs 112, or for assignment to an entirely new VM deployed on the computing device 100.

Decreasing the amount of a hardware resource to a VM 112 can be performed by the VMM 110 dynamically, i.e., "on the fly," without having to first shutdown or even suspend the VM 112 in question. It is noted that the VM 112 is not migrated to another computing device. Furthermore, the amount of the hardware resource that remains assigned to the VM 112 is part of the original amount of the resource that was originally assigned to the VM 112. In the example of the previous paragraph, for instance, of the 32 GB originally assigned to the VM 112A, after decreasing the amount assigned to the VM 112A by 16 GB, the 16 GB that remains assigned to the VM 112A is part of the original 32 GB assigned to the VM 112A.

FIGS. 2A and 2B show example graphs 200 and 250, respectively, depicting two different example hardware resource rates by a VM. In the graph 200 of FIG. 2A, the line 202 denotes the utilization rate of a hardware resource by a VM over time. The dotted line 204 indicates the threshold rate below which the amount of the hardware resource assigned to the VM will be automatically decreased. Furthermore, the dotted line 206 indicates the time at which the utilization rate of the hardware resource will begin to be monitored. Stated another way, the amount of the hardware resource assigned to the VM will not be automatically decreased until the time indicated by the dotted line 206 at the earliest.

The example of FIG. 2A thus may correspond to a "test bed" usage scenario, in which a development team has deployed or instantiated a VM for software development purposes. When the VM is first instantiated, it may be known that the vast majority of the development of the software product in question will occur within two years. Therefore, the dotted line 206 is set to the time t=two years. Before this time, the utilization rate of the hardware resource in question may fall below the threshold 204, as indicated by the line 202. However, the amount of the hardware resource will not be automatically decreased, because it is presumed that active development of the software product, and thus active usage of the VM, is still occurring. Not until two years after deployment will the amount of the hardware resource assigned to the VM be automatically deceased. In the example of FIG. 2A, this occurs at the time corresponding to point 208, when the utilization rate of the hardware resource indicated by the line 202 sustainably drops below the threshold corresponding to the dotted line 204.

In the graph 250 of FIG. 2B, the line 252 denotes the utilization rate of a hardware resource by a VM over time, and the dotted line 254 indicates the threshold rate below which the amount of the hardware resource assigned to the VM will be automatically decreased. Unlike the example of FIG. 2A, in the example of FIG. 2B, the amount of the hardware resource assigned to the VM will be automatically decreased at any time after VM deployment once the utilization rate sustainably drops below the threshold corresponding to the dotted line 254. The example of FIG. 2B may thus corresponding to an "overcommitting" usage scenario, in which an administrator has received a request to deploy a VM, but does not know how many users or for what purpose, for instance, the VM is to be deployed.

Therefore, the VM is deployed with a large amount of the hardware resource in question. The administrator can rest assured that if the amount assigned is too much, the techniques disclosed herein will automatically decrease that amount so that the hardware resource is not inefficiently used. In the example of FIG. 2B, then, soon after the VM is deployed, the utilization rate of the hardware resource in question substantially falls below the threshold corresponding to the dotted line 254, as indicated by the point 256. Thus, at that time, the amount of the hardware resource assigned to the VM is automatically decreased.

FIG. 3 shows an example method 300 for decreasing the amount of a hardware resource assigned to a VM as utilization of the hardware resource by the VM decreases. The method 300 can be performed by a VMM. As such, the method 300 is performed by a processor of a computing device on which the VMM is running. This may be the same or a different computing device than that on which the VM is to be deployed.

The VMM may receive a request to deploy a VM (302). In one implementation, the request includes a specification of an amount of the hardware resource to be assigned (304). In such a case, the amount specified may be increased to overcommit the hardware resource to the VM (306). In another implementation, no specification of the amount of the hardware resource to be assigned to the VM, such that the amount to be assigned is set to a default amount (308). The VM is then deployed or instantiated, which includes assigning the amount of the hardware resource to the VM (310).

The VM is then started (312)—i.e., the VMM causes the VM to run. In one implementation, a predetermined length of time may be waited (314). For example, this length of time may be specified as part of the request in part 302, when the VM is initially deployed. The length of time to be waited is the length of time that is to pass before usage (i.e., utilization) of the hardware resource by the VM is monitored, and thus before the amount of the hardware resource assigned to the VM can be decreased, as has been described in relation to the example of FIG. 2A.

Once usage of the hardware resource by the VM is being monitored (316), when usage thereof is less than a threshold, the amount of the hardware resource assigned to the VM is decreased (318). That usage of the hardware resource by the VM is less than a threshold can mean sustained or average usage of the hardware resource by the VM is less than the threshold. For example, processor usage may be measured as a utilization rate of the processor. If in any given period of time, such as one hour, the average utilization rate of the processor is less than the threshold, then it is deemed that the usage of the processor is less than the threshold. This approach ensures that momentary decreases in usage of the hardware resource by the VM do not trigger a decrease in the amount of the hardware resource assigned to the VM.

In one implementation, the amount of the hardware resource may be decreased to an amount that is a certain percentage above the average usage of the hardware resource by the VM. For example, the VM may be using on average 8 GB of memory, but may have been assigned 32 GB. The certain percentage in this example may be 25%. Therefore, the amount of the memory assigned to the VM is decreased to 125% of 8 GB, or 10 GB of memory. Decreasing the amount to a certain percentage above the average usage of the hardware resource ensures that any subsequent increases in the VM's usage of the resource can be satisfied.

In the same or different implementation, the amount of the hardware resource assigned to the VM may continue to be decreased as the usage of the resource by the VM decreases (320). In this implementation, for instance, the decrease in the amount of the hardware resource at any given time may be relatively and conservatively low. Over time, as usage of the resource continues to decrease, the amount of the hardware resource assigned to the VM is decreased. In this implementation, the amount of the hardware resource assigned to the VM is decreased, as usage of the resource continues to decrease, until the usage of the hardware resource reaches a second threshold lower than the threshold.

FIG. 4A shows an example graph 400 depicting illustrative performance of part 320 of the method 300. The line 402 indicates the utilization rate of a hardware resource by a VM, where the dotted line 404 is the threshold below which the amount of the hardware resource assigned to the VM is decreased. The line 406 indicates the amount of the hardware resource assigned to the VM. Once the utilization rate falls below the threshold and then continues to decrease, the amount of the hardware resource assigned to the VM is decreased in stair-step fashion.

Referring back to FIG. 3, in one implementation, when the usage of the hardware resource of the VM drops below the threshold, the amount of the hardware resource assigned to the VM may initially be decreased at a faster rate, and then at a slower rate (322). This implementation may be suitable, for instance, in cases in which part 306 is performed such that the resource is overcommitted to the VM, or in cases in which part 308 is performed and the default amount of the resource assigned to the VM is vastly too much. Therefore, decreasing the amount of the hardware resource assigned to the VM aggressively at first (and thereafter conservatively) can quickly free up the hardware resource for other purposes.

FIG. 4B shows an example graph 420 depicting illustrative performance of part 322 of the method 300. The line 422 indicates the utilization rate of a hardware resource by a VM, where the dotted line 424 is the threshold below which the amount of the hardware resource assigned to the VM is decreased. The line 426 indicates the amount of the hardware resource assigned to the VM. Once the utilization rate falls below the threshold, the amount of the hardware resource assigned to the VM is decreased first at a faster rate, and then at a slower rate.

Referring back to FIG. 3, in one implementation, when the usage of the hardware resource of the VM drops below the threshold, the amount of the hardware resource assigned to the VM may initially be decreased at a slower rate, and than at a faster rate (324)—i.e., the opposite of part 322. This implementation may be suitable, for instance, in cases in which the VM is used less and less over time. Decreasing the amount of the hardware resource assigned to the VM less aggressively at first (and thereafter more aggressively) thus matches the decreasing usage of the VM.

Figure 4C:
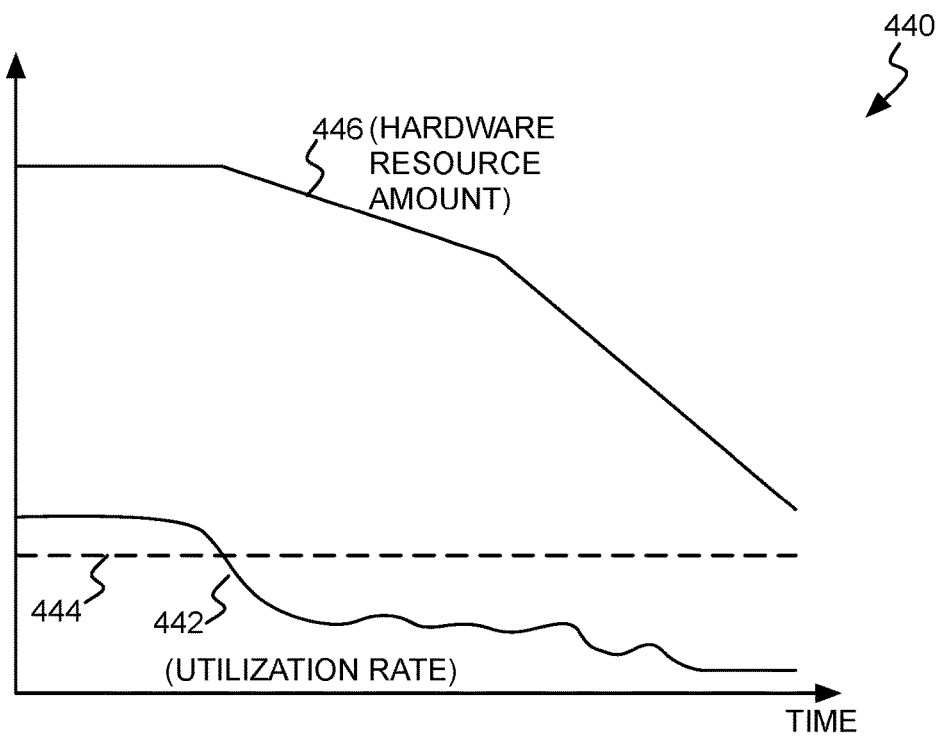

FIG. 4C shows an example graph 440 depicting illustrative performance of part 324 of the method 300. The line 442 indicates the utilization rate of a hardware resource by a VM, where the dotted line 444 is the threshold below which the amount of the hardware resource assigned to the VM is decreased. The line 446 indicates the amount of the hardware resource assigned to the VM. Once the utilization rate falls below the threshold, the amount of the hardware resource assigned to the VM is decreased first at a slower rate, and then at a faster rate.

The examples of FIGS. 4A, 4B, and 4C that have been described are non-linear manners by which the amount of the hardware resource assigned to the VM decreases over time. In FIG. 4A, the amount of the hardware resource assigned to the VM decreases in a stair-step manner over time. In FIG. 4B, the amount of the hardware assigned is decreased at a steeper linear rate initially, and then at a less steep linear rate, such that overall the amount of the hardware assigned is decreased in a non-linear manner. Similarly, in FIG. 4C, the amount of the hardware assigned is decreased at a less steep linear rate initially, and then at a steeper linear rate, such that overall the amount of the hardware assigned is decreased in a non-linear manner.

The techniques disclosed herein advantageous ensure that hardware resources, such as processors, processor cores, storage space or capacity, and memory, are more efficiently used within a virtualization environment. By decreasing the amount of hardware resources assigned to VMs that are not utilizing the resources fully, the hardware resources can be freed up for assignment to other or new VMs, without having to migrate VMs across different computing devices. Further, from an administration perspective, the administrators do not have to manually adjust such resource assignment among VMs.

It is finally noted that, although specific embodiments have been illustrated and described herein, it will be appreciated by those of ordinary skill in the art that any arrangement calculated to achieve the same purpose may be substituted for the specific embodiments shown. This application is intended to cover any adaptations or variations of embodiments of the present invention. Examples of non-transitory computer-readable media include both volatile such media, like volatile semiconductor memories, as well as non-volatile such media, like non-volatile semiconductor memories and magnetic storage devices. It is manifestly intended that this invention be limited only by the claims and equivalents thereof.

We claim:

1. A method comprising:
    assigning, by a processor, an amount of a hardware resource of a computing device to a virtual machine (VM) to be run on a computing device including the hardware resource;
    causing, by the processor, the VM to run on the computing device;
    monitoring, by the processor, usage of the hardware resource by the VM;
    in response to determining that the usage of the hardware resource by the VM is less than a threshold, decreasing, by the processor, the amount of the hardware resource assigned to the VM, and continuing to decrease the amount of the hardware resource assigned to the VM, over time, as the usage of the hardware resource by the VM decreases, until the usage of the hardware resource reaches a second threshold lower than the threshold,
    wherein continuing to decrease the amount of the hardware resource assigned to the VM, over time, as the usage of the hardware resource by the VM decreases comprises one of:
        initially decreasing the amount of the hardware resource assigned to the VM at a faster rate and later decreasing the amount of the hardware resource assigned to the VM at a slower rate;
        initially decreasing the amount of the hardware resource assigned to the VM at a slower rate and later decreasing the amount of the hardware resource assigned to the VM at a faster rate.

2. The method of claim 1, wherein decreasing the amount of the hardware resource assigned to the VM comprises:
    dynamically decreasing the amount of the hardware resource assigned to the VM while the VM runs on the computing device and without stopping the VM.

3. The method of claim 1, further comprising, after causing the VM to run on the computing device:
    waiting a predetermined length of time before monitoring the usage of the hardware resource by the VM.

4. The method of claim 3, further comprising:
    when initially deploying the VM on the computing device, specifying the predetermined length of time that is waited before the usage of the hardware resource by the VM is monitored.

5. The method of claim 1, further comprising, before assigning the amount of the hardware resource to the VM:
    receiving specification of the amount of the hardware resource to be assigned to the VM.

6. The method of claim 5, further comprising, after receiving the specification of the amount of the hardware resource to be assigned to the VM:
    increasing the amount of the hardware resource to actually be assigned to the VM greater than the amount of the specification.

7. The method of claim 1, wherein the amount of the hardware resource assigned to the VM is a default amount of the hardware resource and not an amount specified within a request to deploy the VM on the computing device.

8. The method of claim 1, wherein the processor is a first processor, and the hardware resource is a second processor having a plurality of cores, the amount of the hardware resource being a number of the cores of the second processor.

9. The method of claim 1, wherein the processor is a first processor, and the hardware resource is a plurality of second processors, the amount of the hardware resource being a number of the cores of the second processors.

10. The method of claim 1, wherein the hardware resource is a storage device having a storage capacity, the amount of the hardware resource being an amount of the storage capacity of the storage device.

11. The method of claim 1, wherein the hardware resource is physical memory of a certain amount, the amount of the hardware resource being an amount of the certain amount of the physical memory.

12. A system comprising:
    a computing device having a hardware resource; and
    a hypervisor to deploy a virtual machine (VM) on the computing device including the hardware resource and to assign an amount of the hardware resource of the computing device to the VM,
    wherein the hypervisor is to monitor usage of the hardware resource by the VM when the VM is running, and in response to determining that the usage is less than a threshold, decrease the amount of the hardware resource assigned to the VM,
    wherein the hypervisor is to continue to decrease the amount of the hardware resource assigned to the VM, over time, as the usage of the hardware resource by the VM decreases, until the usage of the hardware resource reaches a second threshold lower than the threshold,
    wherein the hypervisor is to continue to decrease the amount of the hardware resource assigned to the VM, over time, as the usage of the hardware resource by the VM decreases by one of:
        initially decreasing the amount of the hardware resource assigned to the VM at a faster rate and later decreasing the amount of the hardware resource assigned to the VM at a slower rate;
        initially decreasing the amount of the hardware resource assigned to the VM at a slower rate and later decreasing the amount of the hardware resource assigned to the VM at a faster rate.

13. The system of claim 12, wherein the hypervisor is to continue to decrease the amount of the hardware resource assigned to the VM, over time, in a non-linear manner as the usage of the hardware resource by the VM decreases.

14. A non-transitory computer-readable data storage medium storing computer-executable code that a hypervisor executes to perform a method comprising:
assigning an amount of a hardware resource of a computing device to a virtual machine (VM) to be run on a computing device including the hardware resource;
starting the VM on the computing device;
monitoring usage of the hardware resource by the VM;
in response to determining that the usage of the hardware resource by the VM is less than a threshold, decreasing the amount of the hardware resource assigned to the VM, and continuing to decrease the amount of the hardware resource assigned to the VM, over time, as the usage of the hardware resource by the VM decreases, until the usage of the hardware resource reaches a second threshold lower than the threshold,
wherein continuing to decrease the amount of the hardware resource assigned to the VM, over time, as the usage of the hardware resource by the VM decreases comprises one of:
initially decreasing the amount of the hardware resource assigned to the VM at a faster rate and later decreasing the amount of the hardware resource assigned to the VM at a slower rate;
initially decreasing the amount of the hardware resource assigned to the VM at a slower rate and later decreasing the amount of the hardware resource assigned to the VM at a faster rate.

15. The non-transitory computer-readable data storage medium of claim 14, wherein continuing to decrease the amount of the hardware resource assigned to the VM, over time, as the usage of the hardware resource by the VM decreases comprises:
decreasing the amount of the hardware resource assigned to the VM, over time, in a non-linear manner.

* * * * *